United States Patent [19]
Yamahara et al.

[11] 3,708,548
[45] Jan. 2, 1973

[54] METHOD FOR PRODUCING DICHLOROBUTENE

[75] Inventors: Takeshi Yamahara, Higashinada-ku, Kobe-shi; Hiroshi Kishimoto, Takatsuki-shi, Osaka-fu; Shinji Nakamura, Ibaraki-shi, Osaka-fu; Takashi Deguchi, Takatsuki-shi, Osaka-fu; Shichiro Takamatsu, Kamikuo-ku, Kyoto-shi, all of Japan

[73] Assignee: Sumitomo Chemical Co., Ltd., Osaka, Japan

[22] Filed: Nov. 26, 1969

[21] Appl. No.: 880,355

[30] Foreign Application Priority Data

Dec. 10, 1968 Japan ..................................43/90823

[52] U.S. Cl. ..............................................260/654 H
[51] Int. Cl. ...............................................C07c 21/00

[58] Field of Search ...................................260/654 H

[56] References Cited

FOREIGN PATENTS OR APPLICATIONS 661,806  11/1951  Great Britain........................260/654

Primary Examiner—Howard T. Mars
Assistant Examiner—A. Siegel
Attorney—Harry C. Bierman, Jordan B. Bierman and Bierman & Bierman

[57] ABSTRACT

The method comprises the steps of reacting a gaseous mixture comprising butadiene and chlorine in at least a 2:1 molar ratio at a temperature from 150° to 280°C. in a first reaction zone wherein the gaseous reaction mixture is wholly agitated, and then in a second reaction zone wherein the gaseous reaction mixture is not significantly agitated.

4 Claims, No Drawings

METHOD FOR PRODUCING DICHLOROBUTENE

The present invention relates to a method for producing dichlorobutene by a gas phase chlorination of butadiene.

The product of dichlorobutene by a gaseous reaction between butadiene and chlorine is well known. In British Pat. No. 661,806, for instance, a method is disclosed wherein preheated butadiene is contacted with preheated chlorine in a first reaction zone at a relatively low temperature (e.g., 140° to 220°C.) for a relatively short time (e.g., 2 seconds) and then in a second reaction zone at a relatively high temperature (e.g., 200° to 450°C.) for a relatively long time (e.g., 12 to 120 seconds). However, the longer contact time which is required in the second reaction zone necessitates the use of a large and expensive reactor, and also results in the decomposition of product dichlorobutene to undesired substances.

In Japanese Pat. publication No. 14132/1960 a method is disclosed to carry out the gaseous contact at a higher temperature (e.g., 280° to 450°C.) in a shorter time period (e.g., 12 seconds). However, this high reaction temperature causes unfavorable side reactions which result in low yields of dichlorobutene. In both of the above-described methods, chlorine enters the reactor together with the stream of butadiene through a jet or a T-shaped tube. This procedure has a serious disadvantage in that a local heating is likely to occur due to a local high concentration of chlorine and the production of tar resulting from side reactions. This can be avoided by using a large amount of butadiene relative to chlorine or, alternatively, diluting the chlorine gas with an inert gas prior to injection into the butadiene stream. It is clear, however, that such procedures are uneconomical.

The object of the present invention is to provide a method for the gaseous chlorination of butadiene to produce dichlorobutene in excellent yields unencumbered by the disadvantages inherent in the conventionally known methods.

According to the present invention, dichlorobutene is produced by contacting butadiene gas with chlorine gas in at least a 2:1 molar ratio at a temperature from 150° to 280°C. in a first reaction zone wherein the gaseous reaction mixture is wholly agitated and then in a second reaction zone wherein the gaseous reaction mixture is not significantly agitated.

As stated above, the molar ratio of butadiene gas to chlorine gas is at least 2:1. When the amount of butadiene is less than this amount, carbonaceous materials are produced which clog the passage of the reaction zone. When butadiene is used in excess, this results in an increased amount of unreacted butadiene, thereby causing the expenditure of energy. The preferred molar ratio of butadiene to chlorine is within the range of 2–8:1; 3–6:1 is particularly advantageous.

Butadiene gas and chlorine gas are first introduced into a first reaction zone wherein the gaseous reaction mixture is agitated so as to mix chlorine gas with butadiene gas and also to mix the feed gases with the gaseous product. Agitation of the gaseous mixture in the first reaction zone allows the maintenance of a uniform temperature in said reaction zone as well as a uniform concentration of the gaseous reaction mixture. In addition, it serves to suppress the production of tar, thereby enabling high yields of dichlorobutene to be realized.

The agitation in the first reaction zone may be carried out by mechanical operations such as recycling the gaseous mixture, blowing the gaseous feed into the reactor or the like. The efficiency of the agitation will be increased by the proper selection of the position and number of gas feed inlets, the linear velocity of the feed gases and the position and direction of the effluent gas outlet. The inlets for the feed gases are generally positioned far enough apart so as to avoid the immediate contact of the feed gases. Moreover, the inlets are preferably arranged so that the paths from the feed inlets are not near the flow path of the outlet stream. Introduction of the feed gases into the reactor may be carried out through jets such as nozzles, particularly in multiple numbers and in various directions.

The temperature in the first reaction zone is preferably from 150° to 280°C. Higher or lower temperatures will promote unfavorable side-reactions and the production of undesirable by-products unlike the known conventional methods. No preheating of the feed gases is required prior to its introduction into the first reaction zone. The residence time in the first reaction zone varies with the molar ratio of butadiene gas to chlorine gas, as well as other factors. The residence time is usually from 1 to 10 seconds.

The gaseous mixture from the first reaction zone is introduced into a second reaction zone kept at a temperature from 150° to 280°C. wherein the addition of chlorine to butadiene is completed. The gaseous reaction mixture in the second reaction zone is not significantly agitated. The residence time in the second reaction zone varies depending upon the reaction conditions in the first reaction zone, as well as other factors. The residence time is generally less than 10 seconds.

Practical and presently preferred embodiments of the present invention are illustratively shown in the following examples. In these examples, percent is by weight.

EXAMPLE 1

Chlorine gas (200 parts by volume/hour) and butadiene gas (800 parts by volume/hour) are introduced into a stainless steel reactor having one inlet for chlorine gas, four inlets for butadiene gas and one outlet for the gaseous mixture. The inlet for chlorine gas is so arranged as to make an angle of 90° with each of the butadiene inlets. Each of the feed gases is at room temperature (i.e. 10° to 20°C.) and their linear velocity at the inlets is 30 meters/second. The temperature of the gaseous mixture at the center of the reactor is maintained at 200°C. and the temperature difference between any two points in the reactor is kept within 2°C. The effluent gaseous mixture from the reactor flows through the outlet to the upper part of a vertical tubular reactor having a capacity of 1.5 parts by volume, which is directly connected to the outlet. The temperature in the tubular reactor is maintained at 280°C. The effluent gaseous mixture from the tubular reactor is passed through a condensor. The operation is continued for a 2 week period, during which time the condensed product is colorless and transparent. The liquid, after removal of butadiene from the condensed product, consists of 97.5 percent of dichlorobutene, 0.5 percent of lower boiling point fractions, and 2.0 percent of higher boiling point fractions. The average yield of dichlorobutene based on the chlorine gas feed over the entire operating time is 97 percent.

EXAMPLE 2

In a first cylindrical reactor equipped with an agitator, chlorine gas (900 parts by volume/hour) and butadiene gas (3,600 parts by volume/hour) at room temperature (i.e., 10° to 20°C.) are introduced from different directions while agitating. The temperature in the reactor is maintained at 250°C. and the temperature difference between any two points in the reactor is kept to within 1°C. The effluent gaseous mixture from the first reactor is then sent to a second oil-jacketed reactor having a capacity of 7.5 parts by volume. The temperature in this reactor is maintained at no higher than 250°C. The effluent gas is passed through a condensor. After removal of butadiene from the condensed product, the liquid consists of 97.7 percent of dichlorobutene, 0.6 percent of lower boiling point fractions, and 1.7 percent of higher boiling point fractions. The average yield of dichlorobutene based on the chlorine gas feed is 97 percent.

EXAMPLE 3

In the cylindrical reactor described in Example 2, chlorine gas (300 parts by volume/hour) and butadiene gas (1,200 parts by volume/hour) are introduced. The temperature in the reactor is maintained at 170°C. The effluent gaseous mixture from the reactor is sent to an oil-jacketed reactor having a capacity of 3 parts by volume. The temperature in this reactor is maintained at no higher than 260°C. The effluent gas is then sent through a condensor. After removal of butadiene from the condensed product, the liquid consists of 96.6 percent of dichlorobutene, 0.4 percent of lower boiling point fractions, and 3.0 percent of higher boiling point fractions. The average yield of dichlorobutene based on the chlorine gas feed is 96 percent.

EXAMPLE 4

Butadiene gas (800 parts by volume/hour) is introduced into the upper end of the jacketed tubular reactor. Simultaneously, chlorine gas (200 parts by volume/hour) is fed into the stream of butadiene gas by means of a nozzle. The chlorine gas and the butadiene gas are preheated to 110°C. and 140°C. respectively, prior to entering the reactor. The temperature in the reactor is maintained at 175°C. at the upper end and at 250°C. at the lower end. After 20 hours, a large amount of tar is produced around the inlet nozzle for chlorine gas, and the reaction product is blackish brown. After removal of butadiene from the reaction product, the liquid consits of 90.8 percent of dichlorobutene, 2.6 percent of lower boiling fractions, and 6.6 percent of higher boiling fractions. When the operation is carried out as described above without preheating the feed gases, the liquid, after removal of butadiene, consists of 87.9 percent of dichlorobutene, 1.5 percent of lower boiling point fractions, and 10.7 percent of higher boiling point fractions.

What is claimed is:

1. In the production of dichlorobutenes by reacting butadiene with chlorine in a molar ratio of respectively 2:1 to 8:1, at an elevated temperature, in the vapor phase, and in two reaction zones, the improvement which comprises introducing the butadiene and the chlorine separately and directly into a first reaction zone maintained at a temperature of from 150° to 280°C and containing a gaseous reaction mixture of butadiene and chlorine, the introduced butadiene and the introduced chlorine not being preheated prior to introduction into the first reaction zone; thoroughly mixing the introduced butadiene and chlorine with the gaseous reaction mixture; then introducing the mixture of introduced butadiene, introduced chlorine, and reaction mixture into a second reaction zone maintained at a temperature of from 150° to 280°C and wherein the introduced mixture is not significantly agitated.

2. The method according to claim 1 wherein the introduction into the first reaction zone is through a plurality of jets.

3. The method according to claim 1 wherein the residence time in the first reaction zone is 1 to 10 seconds, and the residence time in the second reaction zone is less than 10 seconds.

4. The method according to claim 1 wherein the introduction into the first reaction zone is through a plurality of jets.

* * * * *